(12) United States Patent
Buzick et al.

(10) Patent No.: US 8,997,635 B2
(45) Date of Patent: Apr. 7, 2015

(54) VERTICAL GRILL

(76) Inventors: Bonnie Lee Buzick, Fresno, CA (US);
Robert Bair, Fresno, CA (US)

(*) Notice: Subject to any disclaimer, the term of this patent is extended or adjusted under 35 U.S.C. 154(b) by 546 days.

(21) Appl. No.: 13/083,425

(22) Filed: Apr. 8, 2011

(65) Prior Publication Data

US 2012/0255449 A1    Oct. 11, 2012

Related U.S. Application Data

(63) Continuation-in-part of application No. 12/592,832, filed on Feb. 25, 2010, now abandoned.

(51) Int. Cl.
*A47J 37/06* (2006.01)
*A47J 37/07* (2006.01)

(52) U.S. Cl.
CPC .................. *A47J 37/0722* (2013.01)

(58) Field of Classification Search
CPC .................................................. A47J 37/0722
USPC ....... 99/375, 389, 421 H, 444, 386, 349, 393, 99/423, 443 C; 126/25 R
See application file for complete search history.

(56) References Cited

U.S. PATENT DOCUMENTS

| | | | |
|---|---|---|---|
| 3,581,654 A | | 6/1971 | Tescula |
| 3,742,838 A | | 7/1973 | Luschen et al. |
| 4,261,257 A | * | 4/1981 | Henderson et al. ............. 99/386 |
| 4,619,190 A | | 10/1986 | Smith |
| 4,647,758 A | * | 3/1987 | Kelian ......................... 219/385 |
| 5,006,355 A | * | 4/1991 | Stuck et al. .................. 426/243 |
| 5,132,520 A | * | 7/1992 | Blanton et al. ............... 219/400 |
| 5,673,610 A | * | 10/1997 | Stuck .............................. 99/386 |
| 7,217,906 B2 | * | 5/2007 | Veltrop et al. ............... 219/386 |
| 7,806,046 B2 | * | 10/2010 | Long et al. ..................... 99/399 |

OTHER PUBLICATIONS

International Search Report, May 25, 2011 Written Opinion May 19, 2011.

* cited by examiner

*Primary Examiner* — Jianying Atkisson

(57) ABSTRACT

A vertical grill (11) for cooking food items is disclosed wherein the vertical grill is comprised of a body (12) containing at least one vertical grilling area disposed between at least two sources of radiant heat energy (24), and wherein the body (12) is adapted to direct fats and breakaway solids generated during the cooking of the food into an external receptacle (32) via the external opening (22). It achieves this by including (Evacuation Slides) guides (28) and (30) which are contained within the body (12) of the grill (11) and arranged in various shaped assemblies such that food and fats falling on (Evacuation Slide) guide 28 travels down until it is collected by (Evacuation Slide) guide (30) which delivers the food and fats to the external receptacle (32) where they are not in any danger of catching fire.

28 Claims, 11 Drawing Sheets

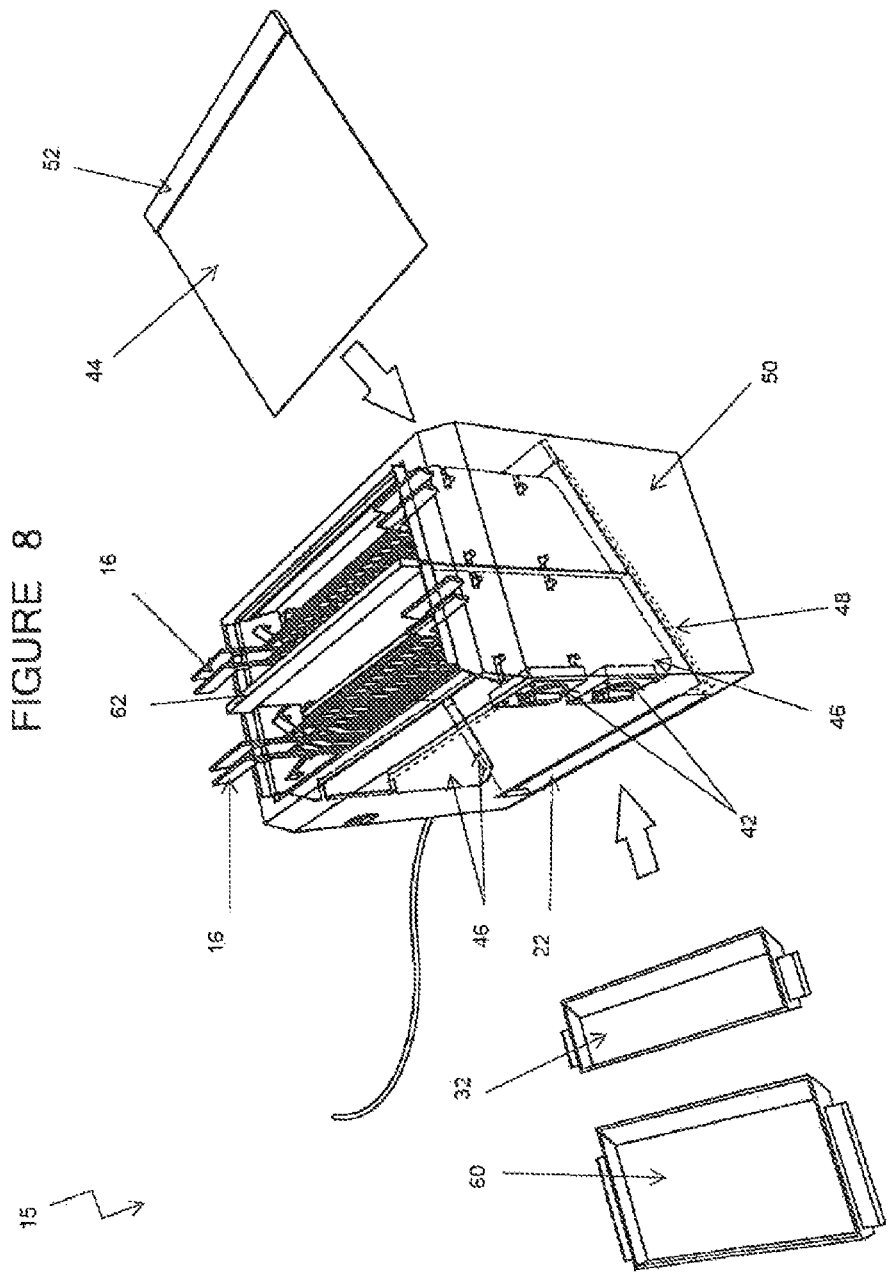

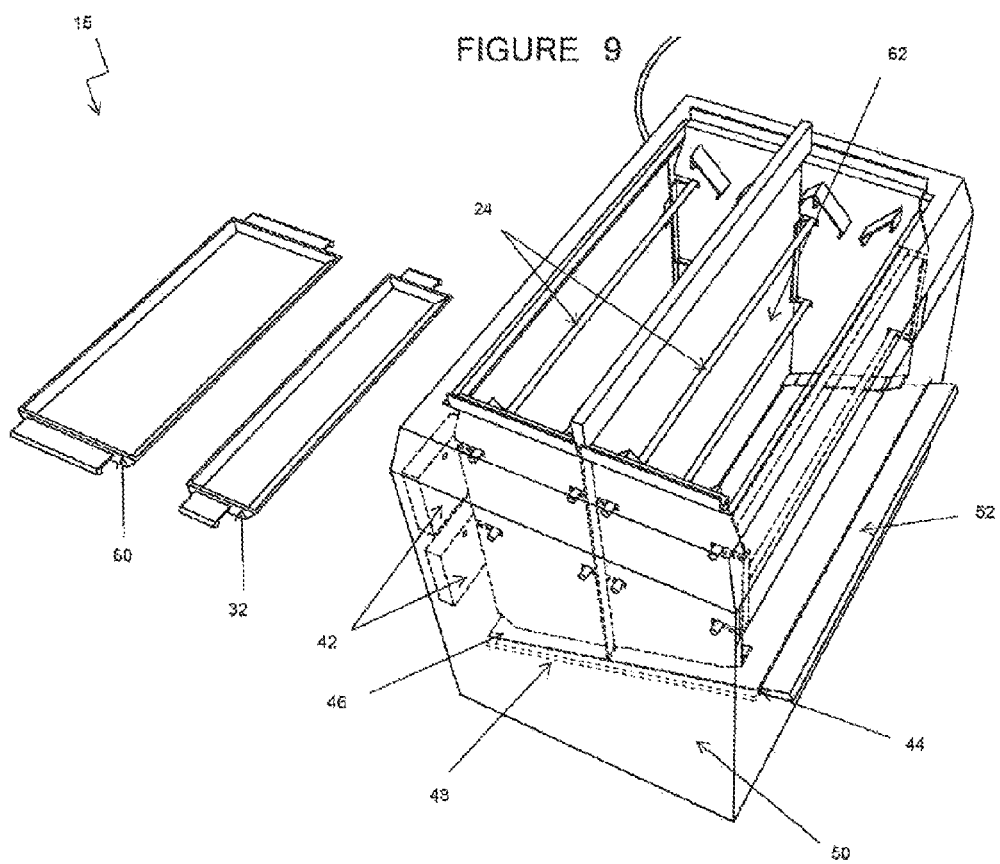

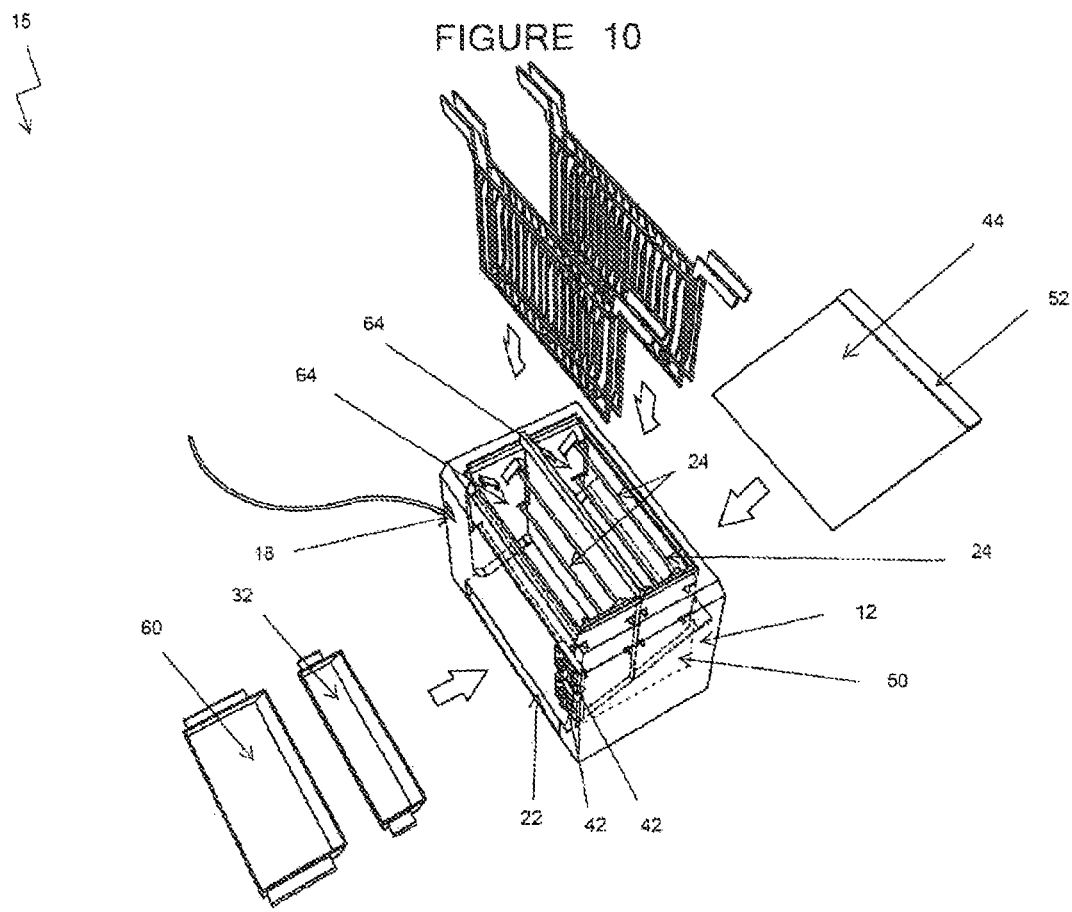

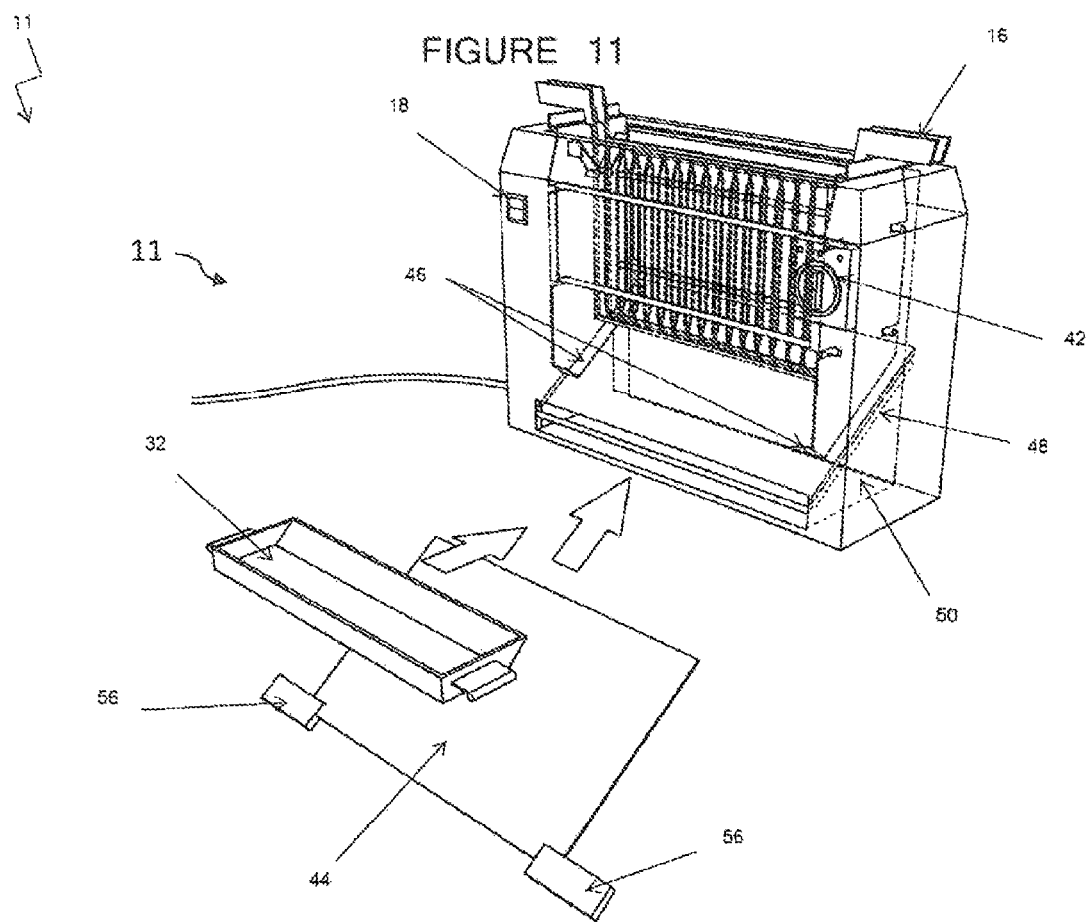

VERTICAL GRILL

CROSS-REFERENCE TO RELATED APPLICATIONS

The present application is a continuation in part of U.S. application Ser. No. 12/592,832 filed Feb. 25, 2010, currently pending, and is hereby incorporated herein by reference in its entirety.

TECHNICAL FIELD

This invention relates to cooking appliances for use in domestic and commercial kitchens. The invention relates particularly to electric grills that can be used to cook food in a way that removes fat from the food that is cooked. In particular the invention relates to a vertical electric grill.

BACKGROUND OF THE INVENTION

Obesity together with heart disease has been linked to high consumption of saturated fats and cholesterol found in most meat products. The American Heart Association ("AHA") has recommended that individuals should, in order to reduce the risk of heart disease and cancer, reduce their daily intake of saturated fats and cholesterol.

Grills in which the radiant cooking elements and grilling space have been arranged vertically are particularly well adapted to remove fats from meat that is being cooked. As the food is suspended between the cooking elements gravity and pressure of a holding clasp act on liquefied fats and oils such that they drip out of and away from the food being cooked. Vertical grills have been recommended by heart physicians as a suitable device to help patients and the public reduce their intake of saturated fats that would otherwise be ingested with conventionally cooked meats. The vertical radiant heat grilling configuration was much favoured by the public as a real grill over 'grilling' on or frying on flat metal, Teflon or other fire resistant surfaces.

However, there were problems associated with prior art vertical grills. The prior art vertical grill used an internal drip tray to retain fats and oils that drip down from the food being grilled between two radiant cooking elements. Unfortunately, the prior art vertical grill with an internal drip tray is prone to fire flare-ups and smoke.

As a result if the internal drip tray is not cleaned thoroughly before each use to ensure there are no combustible fats or solids present in the tray, there is a good chance that the contents of the tray will combust. Further, users were also recommended to add a small quantity of cold water to the internal drip tray to reduce the volatility of the liquefied fats and oils that accumulated in the tray.

Because the drip tray was internal to the device some people were unaware of the requirement to clean out the drip tray and/or to add water and as a result the device would sometimes catch fire.

As a result of fire risk, some prior art vertical grill designs employed an internal drip tray that features a fire suppressing perforated metal cover. However this design had its drawbacks. First, the perforated cover actually makes it more likely that a user of the device will forget to empty the contents of the drip tray as the retained oils and fats will be mostly obscured by the internal drip tray cover. In such a case where the internal drip tray is hidden from view within the body of the vertical grill, dangerous reserves of retained fats and oils could easily go unobserved. Further, the use of a perforated metal fire suppressing shield resulted in solid spoils and embers from above, coming to rest on the protective fire shield. These solids sometimes blocked the perforations resulting in an accumulation of fats and oils on its surface which, along with the solids themselves, can often result in smouldering embers and ignited fats entering into the internal cavities of the device, and/or cause the fats in the drip tray to ignite despite the presence of the fire suppressing shield. It is a common complaint by users of the vertical grill that a blocked or inappropriately prepared internal drip tray can permit smouldering embers to activate kitchen fire alarms.

It is an object of the present invention to improve on the design of prior art vertical grills and/or to substantially ameliorate some of the shortcomings of the prior art vertical grills.

BRIEF SUMMARY OF EMBODIMENTS OF THE INVENTION

A first aspect of the invention comprises an electric grill for cooking food items, wherein the electric grill is comprised of a body containing at least one vertical grilling area disposed between at least two sources of radiant heat energy, and wherein the body is adapted to direct fats and breakaway solids generated during the cooking of the food away from the cooking element down through the body of the electric grill and out into an external receptacle.

Preferably the body is adapted to direct fats and breakaway solids generated during cooking to an external drip tray by means of one or more slides that define a path to the external receptacle via an external opening formed in the body.

A first embodiment of the first aspect of the invention provides a electric grill with a body containing at least two slides that are disposed between sides of the body and the at least two sources of radiant heat, wherein the slides direct fats and breakaway solids generated during cooking to an external receptacle via the external opening.

Still more preferably the two slides are disposed in a y shaped assembly wherein the lower end of the longer slide in the y shaped assembly terminates near the external opening.

A second embodiment of the first aspect of the invention provides a electric grill with a body containing one vertical grilling area and a single angled slide which is disposed below the grilling area and is pitched at an angle sufficient to direct fats and breakaway solids that drop down upon it to an external receptacle via the external opening.

Preferably the angled slide is planar and is adapted to be inserted and removed from the body of the vertical grill.

Still more preferably, the angled slide is adapted to be inserted from an upper portion of the side of the electric grill that is opposite the side that has the external opening.

Alternatively, in a third embodiment of the first aspect of the invention, the angled slide of the second embodiment is adapted to be inserted and removed from the body via the external opening.

In a fourth embodiment of the first aspect of the invention, an electric grill with a body that has one vertical grilling area and wherein the one or more slides is comprised of a wedge inserted into the body so that it is situated below the one vertical grilling area and wherein a top surface of the wedge is pitched at an angle sufficient to direct fats and breakaway solids generated during the cooking of the food that drop down upon it to an external receptacle via the external opening.

In a fifth embodiment of the first aspect of the invention there is provided a electric grill with a body in which there are two vertical grilling areas disposed between at least three sources of radiant heat, such that there is at least a source of radiant heat on each side of each vertical grilling area and wherein the body of the electric grill is adapted to direct fats and breakaway solids generated during the cooking of the food away from the cooking element down through the vertical grill and out into an external receptacle.

Preferably the body is adapted to direct fats and breakaway solids generated during the cooking of the food away from the cooking element down through the vertical grill and out into an external receptacle by the inclusion of slide means which direct and/or guide splattered fats to the external receptacle from a position within the body.

Preferably the slide means comprises a single angled slide which is disposed below the grilling areas and is pitched at an angle sufficient to direct fats and breakaway solids generated during the cooking of the food that drop down upon it to the external receptacle via the external opening.

Still more preferably the single angled slide is introduced via a slot formed in the side of the body which is opposite to the side of the body which has the external opening.

Preferably, with respect of all of the embodiments of the invention, the external receptacle is adapted to engage with the external opening.

More preferably the external receptacle may be covered or partially covered by a protective hood.

Preferably the protective hood is connected to the grill and is also semi transparent.

Still more preferably with respect to all of the embodiments of the first aspect of the invention, the electric grill has a timer.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 8 is an exploded perspective view of a fifth embodiment of the first aspect of the invention;

FIG. 9 is a close up view of the grill according to the fifth embodiment according to the first aspect of the invention;

FIG. 10 is a further exploded perspective view of the fifth embodiment of the first aspect of the invention; and FIG. 11 is a perspective view of a third embodiment of the first aspect of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
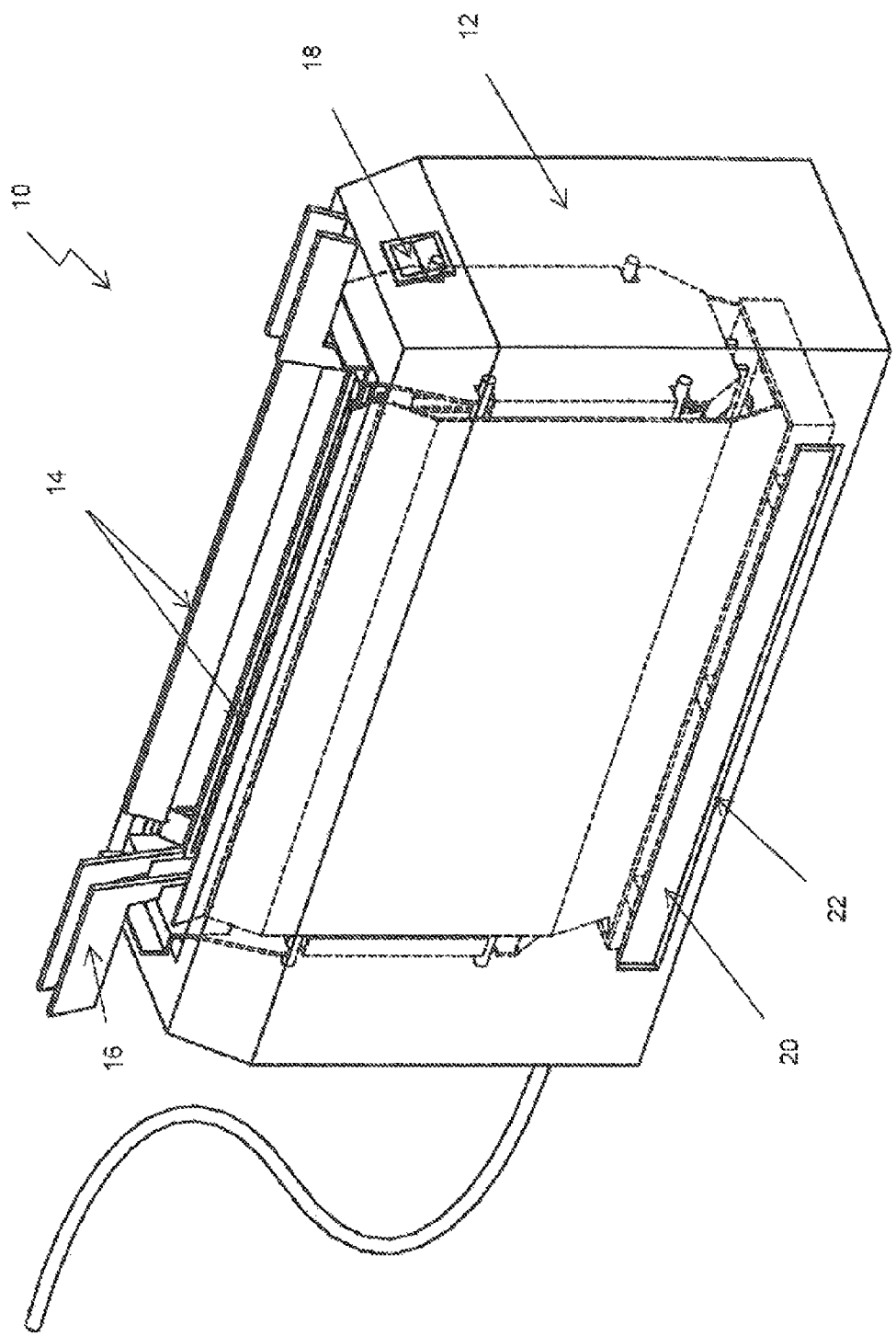
FIG. 1 is a perspective view of a prior art electric grill in which the internal drip tray is in place within the body of the electric grill.
Figure 2:
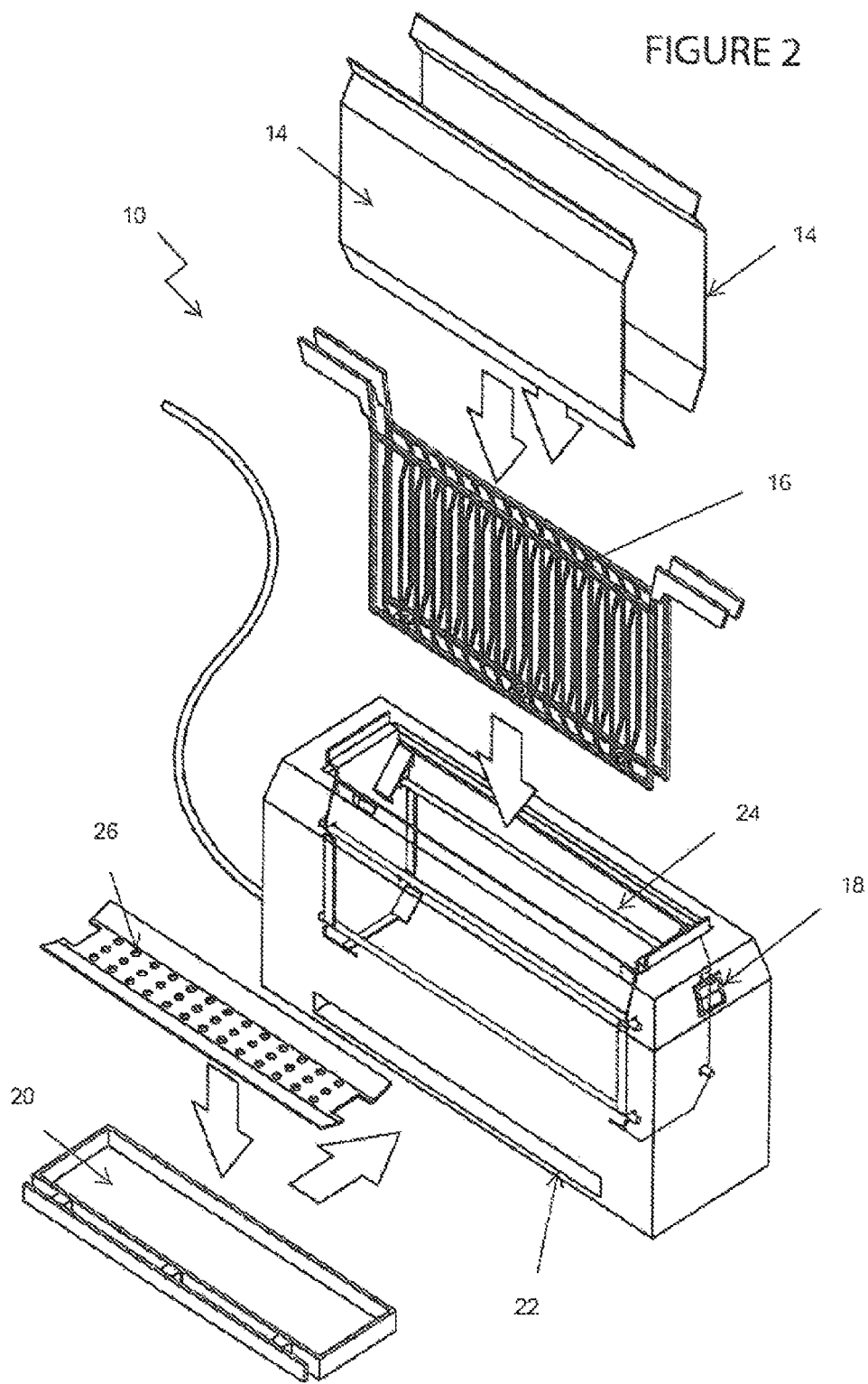
FIG. 2 is an exploded perspective view of a prior art electric vertical grill.

Referring to FIGS. 1 and 2, these figures depict a prior art vertical electric grill 10 in which the following components are visible:

12: body
14: heat reflector and splatter shields
16: food clasp handle/grill
18: power switch
20: internal drip tray
22: external opening
24: cooking element
26: perforated cover The prior art vertical grill 10 had the major disadvantage of collecting splattered fat and bits of food directly under the cooking area of the grill, either in the internal drip tray 20, or just above the perforated cover 26. These areas are subject to high radiant heat and high temperatures and as a result, the contents of the internal drip tray 20 or the food and fat that may sit on the perforated cover 26, may catch fire or generate large amounts of smoke.

A potential solution provided herein to ameliorate the above stated problem involves providing a electric grill in which the fats and breakaway solids are channeled to a receptacle or drip tray that sits outside of the body of the grill, away from high heats.

Figure 3:
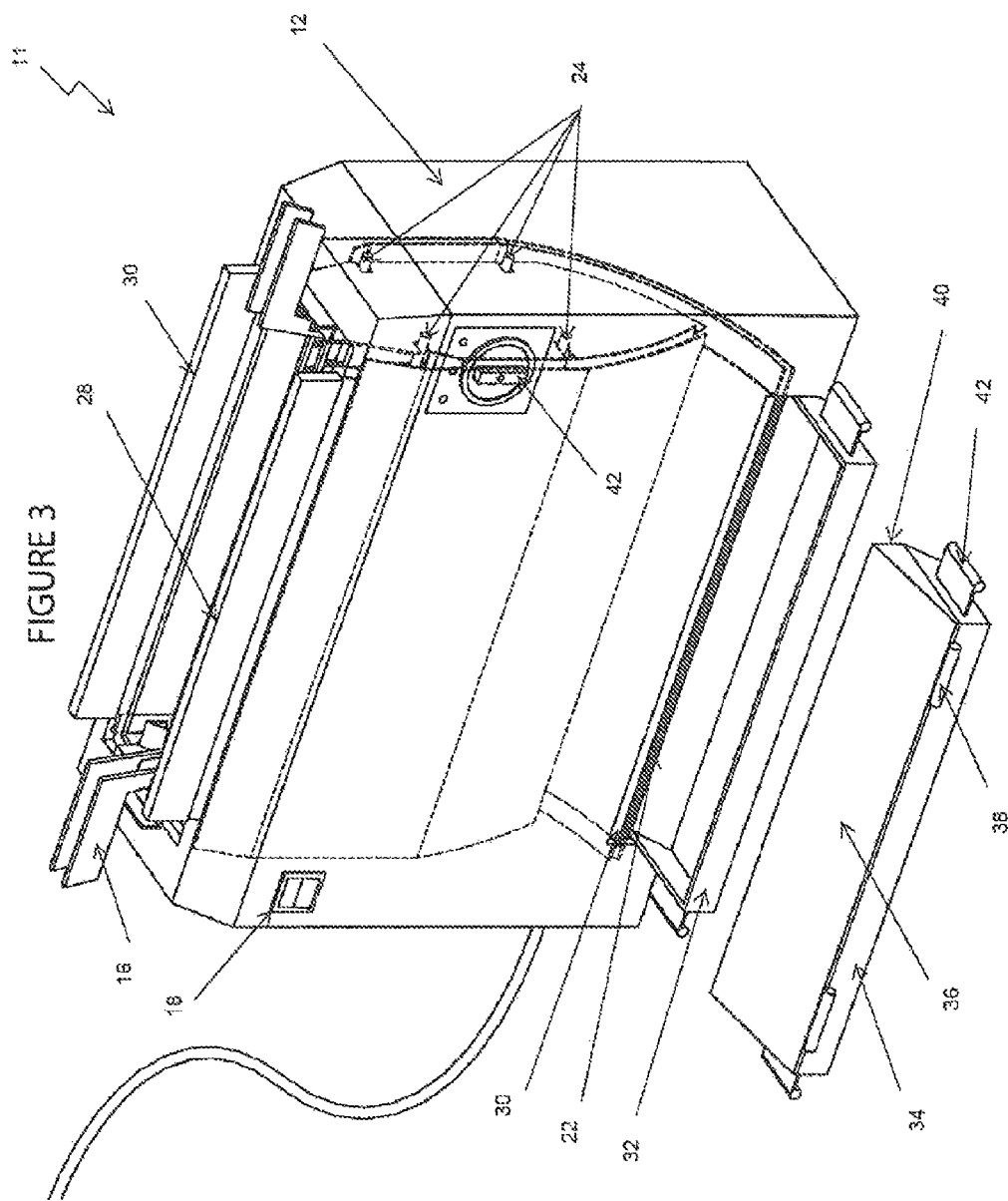
FIG. 3 is a perspective view of a first embodiment of a first aspect of the invention.
Figure 4:
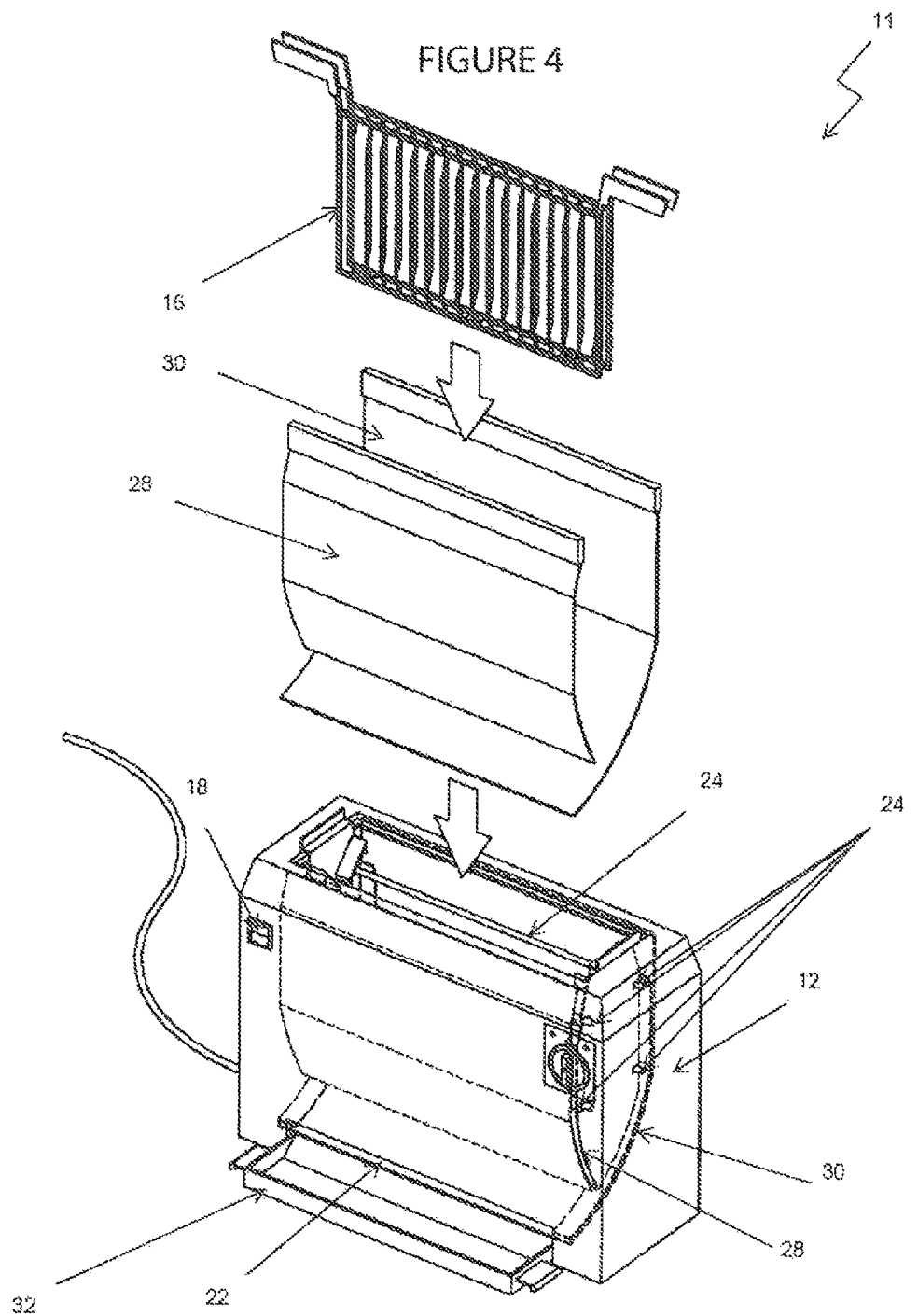
FIG. 4 is an exploded perspective view of the first embodiment of the first aspect of the invention.

The first embodiment of the invention is shown in FIGS. 3 and 4. In this embodiment the two heat reflector and splatter shields 14 of FIGS. 1 and 2 have been replaced by multipurpose evacuation slides 28 and 30. Evacuation slide 30 is longer and larger than evacuation slide 28. The evacuation slides 30 are inserted into the space between the side walls of the body 12 and the cooking elements 24. Evacuation slides 28 and 30 are also arranged in a y shaped assembly such that any splattered fat collected on evacuation slide 28 drops off the lower end of evacuation slide 28 onto evacuation slide 30 which then delivers it to the external opening 22 for collection into the external receptacle or drip tray 32. The external drip tray 32 is adapted to have a small portion attach to or ride against the external opening 22. When inserted, food and fats that fall onto either of the evacuation slides 28 or 30 exit the external opening 22 and are received into the open top of the external drip tray 32. Grips 42 provide for the ability to handle the hot fats safely whilst at the same time, providing a stop mechanism to prevent the external drip tray 32 from being over inserted into the external opening 22. Grips 42 can also be adapted to engage external opening 22 by way of a mechanism, magnets or other means which allow the external drip tray 32 to remain in close association with the body 12 whilst remaining easily removable.

A hooded external drip tray 34 is shown in FIG. 3. This hooded external drip tray 34 is similar to external drip tray 32 except that it may have a tinted and transparent hood 36 which covers the top of the tray so as to prevent users from touching the hot contents. The hood 36 is pivotally connected to the tray base 34 via hinges 38 and features an aperture at the front of the hood 40 that communicates with the external opening 22 so that fats and food can enter the tray for collection. The hooded external drip tray 34 may be used wherever the external drip tray 32 is shown with respect to all of the embodiments of the invention. As an alternative (not shown) an external drip tray 32 can be used with a grill body that has a connected hood which covers the external drip tray 32.

Figure 5:
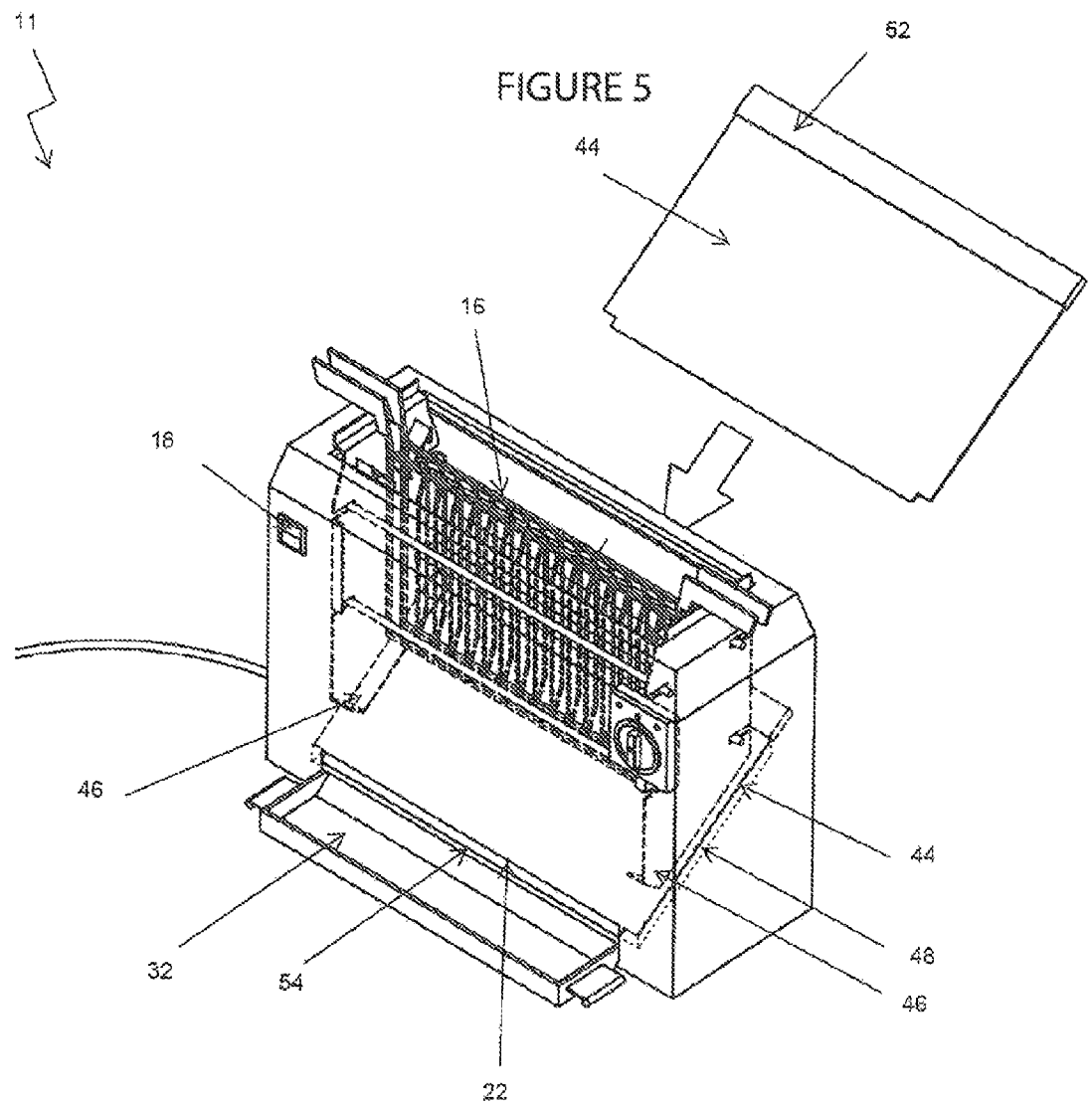
FIG. 5 is a partially exploded front perspective view of a second embodiment of the first aspect of the invention.
Figure 6:
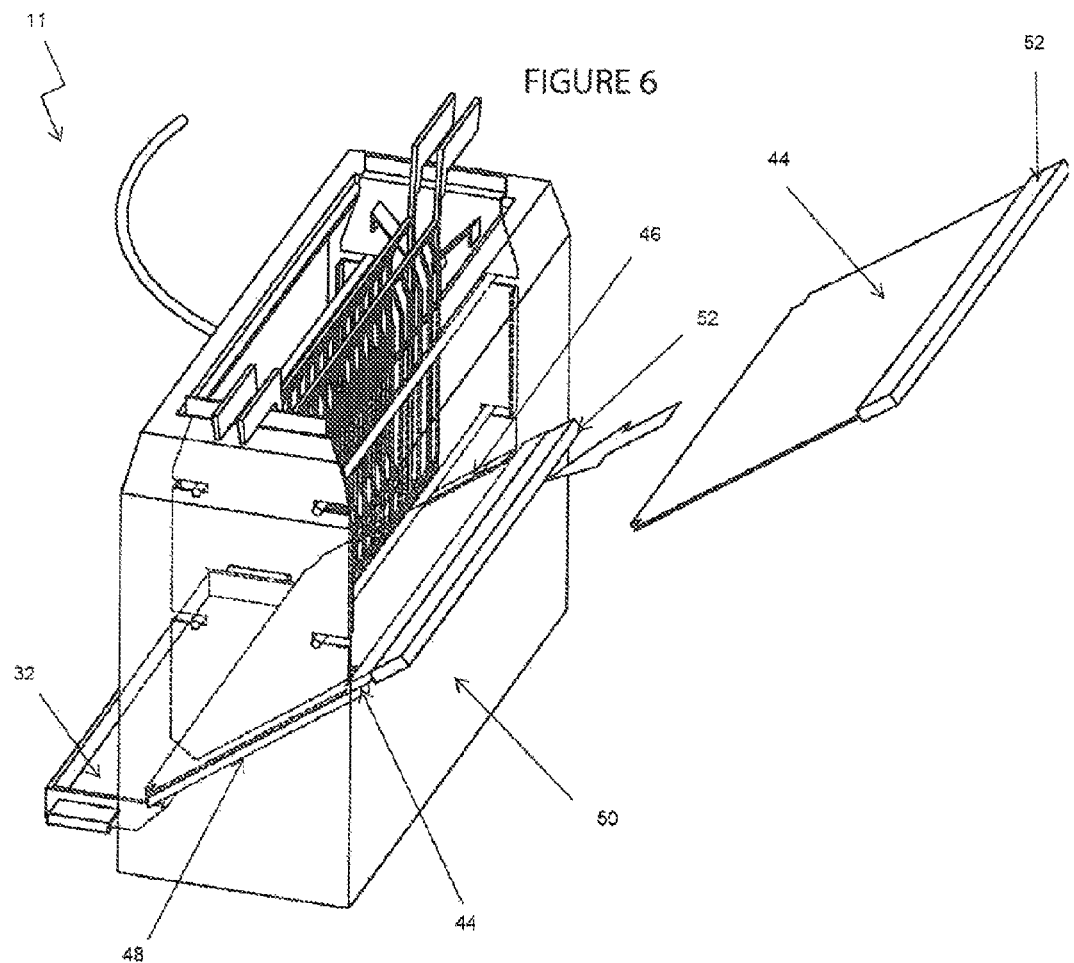
FIG. 6 is a partially exploded rear perspective view of the second embodiment of the first aspect of the invention.

Depicted in FIGS. 5 and 6 is a second embodiment of the invention. In this embodiment the two slides 28 and 30 from FIGS. 3 and 4 are replaced with flat slide 44 incorporating handle 52. This slide 44 is inserted at an angle into the rear side of the body 12 of the vertical grill 11 which is opposite the side of the body 12 which has the external opening 22.

The flat slide 44 is inserted between base element 48 and top guides 46 and comes to rest such that its lower edge 54 sits slightly higher than the top edge of external drip tray 32 so that food and fats that fall on the flat slide 44 fall into the external drip tray 32 where they are not subjected to high heat and accordingly will not catch fire.

A third embodiment depicted in FIG. 11 is very similar to the second embodiment depicted in FIGS. 5 and 6. The substantial difference between them is that the flat slide 44 has a pair of split handles to facilitate its insertion up into the body 12 of the vertical grill 11 where it sits between base 48 and top guides 46.

Figure 7:
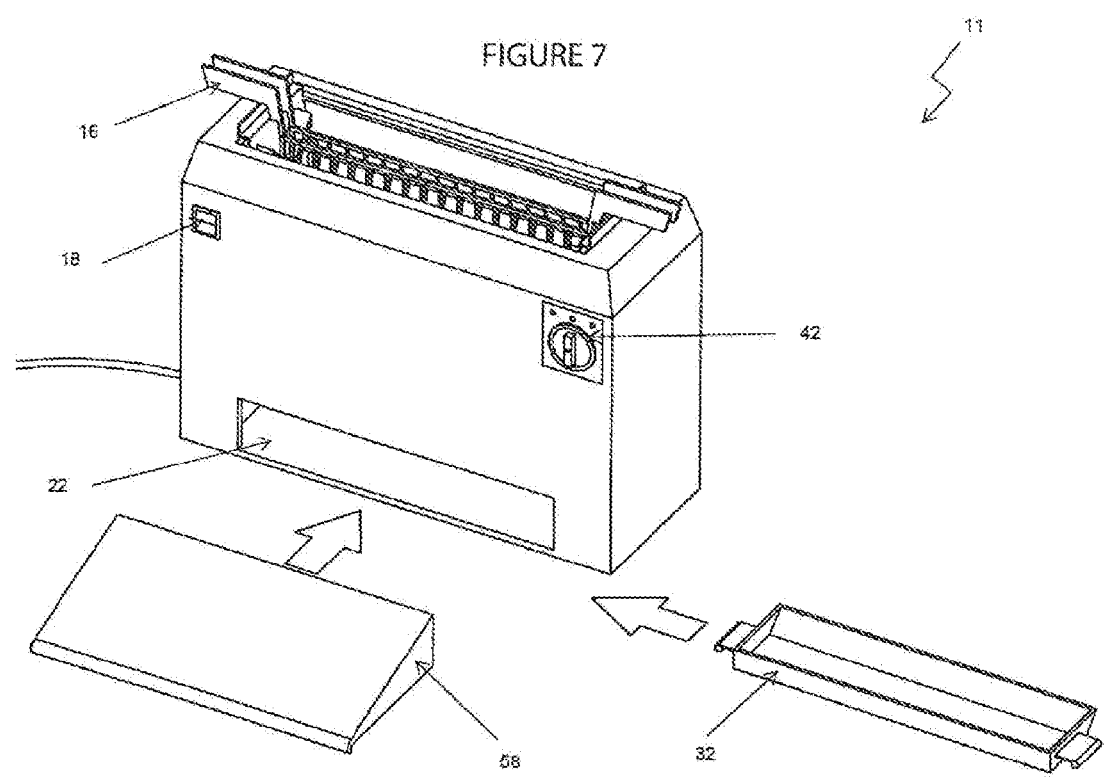
FIG. 7 is an exploded perspective view of a fourth embodiment of the first aspect of the invention.

A fourth embodiment depicted in FIG. 7 is similar to the third embodiment depicted in FIGS. 5 and 6 in that the flat slide 44 is replaced with a pitched wedge 58 which is inserted into the external opening 22. After insertion into the body 12 of the vertical grill 11, a portion of the external drip tray 32 is inserted into the external opening 22 so that it receives all of the food and fat collected on the surface of pitched wedge 58.

A fifth aspect of the invention depicted in FIGS. 8-10 comprises a electric grill 15 with a body 12 featuring two vertical grilling areas 64 divided by a removable reflector/splatter screen 62. Besides the oversized external drip tray 60 which can be used when both grilling areas are being used at the same time, the arrangements of base 48, flat slide 44, top guides 46 and external opening 22 are the same as the invention depicted in FIGS. 5 and 6. The electric grill 15 has at least 3 sets of cooking elements 24 (with one central, common cooking element 24), however the preference is for there to be 4 sources of radiant energy, with one set of cooking elements 24 on each side of each cooking area.

In a sixth embodiment of the invention (not shown), the single flat slide which is installed at an angle is replaced with an inverted V shape slide which is centered under the removable reflector/splatter shield 62 such that each of the vertical grilling areas 64 sits over an angled portion of the inverted V slide, wherein the angled portion delivers splattered fats and breakaway solids to two external drip trays which are located at either side of the vertical grill. In this embodiment the inverted V slide is formed in one piece and is inserted and removed via one of the short sides via a V shaped slot formed in the short sides of the grill. Alternatively, the inverted V slide may be formed by introducing two flat slides into the body of the vertical grill, through one or more sides, including the ends and the longer front or back sides. In this embodiment top guides and base elements may be used to guide the individual flat slides into place where they form the inverted V structure when both are inserted.

All of the embodiments described feature a power switch 18 and at least one separate timer knob 42. The heat emitted by the elements 24 may be controlled with a rheostat or other similar component. The second, third, fourth and fifth embodiments also feature space 50 for a cord storage area if desired, through the installation of a door, aperture, recess or compartment (not shown).

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An electric grill for cooking food items, wherein:
    the electric grill is comprised of a body containing at least one vertical grilling area disposed between at least two sources of radiant heat energy, the vertical grilling area comprising a food holder configured for holding the food items adjacent to the source of radiant heat energy and preventing the food items from falling while allowing at least one of liquified fats and breakaway solids to separate and drop away from the food items;
    the body has an external opening on a vertical side thereof and contains one or more slides disposed below the grilling area;
    the one or more slides define a path to an external receptacle via the external opening, the entire path sloping downward to direct and expel at least one of the liquified fats and breakaway solids generated during the cooking of the food items away from the cooking elements downward and laterally through the body of the electric grill and out into the external receptacle for cooling therein; and
    the receptacle is detachably joined to or detached from the outside of the body, and is disposed outside of the body near the external opening during the operation of the grill, such that the receptacle is laterally removed from the grilling area, and the receptacle's bottom section on which at least one of the liquified fats and the breakaway solids is collected is lower than a lower edge of the slide terminating in a proximity of the external opening.

2. The electric grill of claim 1 wherein the one or more slides that define the path to the external receptacle via the external opening comprises first and second evacuation slides that are disposed between sides of the body and the at least two sources of radiant heat.

3. The electric grill of claim 2, the first evacuation slide is longer than the second evacuation slide and wherein the two evacuation slides are disposed in a y shaped assembly, such that at least a portion of the first evacuation slide is located below a lower end of the second evacuation slide, such that at least one of the liquefied fats and the breakaway solids collected on the second evacuation slide drops off the lower end of the second evacuation slide onto the first evacuation slide, wherein the lower end of the first evacuation slide in the y shaped assembly terminates in a proximity of the external opening in a downward sloping manner.

4. The electric grill of claim 1 wherein the one or more slides that define the path to the external receptacle via the external opening formed in the body comprises a single angled slide which is disposed below the vertical grilling area and is pitched at an angle sufficient to direct at least one of the liquefied fats and breakaway solids generated during the cooking of the food items that drop down upon it to the external receptacle via the external opening.

5. The electric grill of claim 4 wherein the angled slide is planar.

6. The electric grill of claim 5, comprising a slot formed in a side of the body which is opposite to the side of the body which has the external opening, the slot being configured for receiving the angle slide, such that the angled slide is adapted to be insertable into and removable from the body via the slot.

7. The electric grill of claim 5 wherein the angled slide is adapted to be inserted and removed from the body via the external opening.

8. The electric grill of claim 1 wherein the one or more slides that define the path to the external receptacle via the external opening comprises a wedge inserted into the body so that the wedge is situated below the vertical grilling area, the wedge terminating on a downward slope and wherein a top surface of the wedge is pitched at an angle sufficient to direct at least one of the liquefied fats and breakaway solids that drop down upon it to the external receptacle via the external opening.

9. The electric grill of claim 1 wherein there are two vertical grilling areas disposed between at least three sources of radiant heat.

10. The electric grill of claim 9 wherein the one or more slides that define the path to the external receptacle via the external opening terminate on a downward slope and are comprised of a single angled slide which is disposed below the grilling areas and is pitched at an angle sufficient to direct at least one of the liquefied fats and the breakaway solids that drop down upon the single angled slide to the external receptacle via the external opening.

11. The electric grill of claim 10, comprising a slot formed in a side of the body which is opposite to the side of the body which has the external opening, the slot being configured for receiving the single angled side, such that the single angled slide is insertable into and removable from the grill's body via the slot.

12. The electric grill according to claim 1 wherein the external receptacle is adapted to engage with the external opening disposed on the body.

13. The electric grill according to claim 1 wherein the electric grill includes a timer and where the heat emitted by the electric elements is controlled by a rheostat.

14. An electric grill for cooking food items, comprising:
a housing having an external opening on a side thereof;
at least one vertical grilling area disposed adjacent to a source of radiant heat energy, the vertical grilling area comprising a food holder configured for holding the food items adjacent to the source of radiant heat energy and preventing the food items from falling while allowing at least one of the liquefied fats, oils, and breakaway solids to separate and drop away from the food items;
an external receptacle detachably connected to or detached from and adjacent to an outside of the housing and disposed outside of the housing during the operation of the grill and laterally removed from the grilling area; and
an internal mechanism comprising one or more solid surfaces positioned under the food holder and configured to define a uninterrupted downward sloping path to redirect and evacuate at least one of the liquefied fats, oils, and breakaway solids produced during the cooking of the food items, as at least one of the liquefied fats, oils, and breakaway solids fall from the food items due to gravity downward from the cooking materials in the grill and are directed by the solid surfaces along the downward and lateral sloping path defined by the one or more solid surfaces extending through an interior of the housing and terminating outside the housing and depositing at least one of the fats, oils, and breakaway solids into the external receptacle for cooling therein;
wherein the external receptacle is disposed such that the receptacle's bottom section on which at least one of the fats, oils, and breakaway solids are collected is lower than a lowest edge of the one or more solid surfaces.

15. The electric grill of claim 1, wherein the external receptacle comprises one or more side walls all disposed outside the housing during operation of the grill, wherein a top receptacle is open.

16. An electric grill for cooking food items, comprising:
a housing having an external opening on a vertical side thereof;
at least one vertical grilling area disposed adjacent to a source of radiant heat energy, the vertical grilling area comprising a food holder configured for holding the food items adjacent to the source of radiant heat energy and preventing the food items from falling while allowing at least one of liquefied fats and breakaway solids to separate and drop away from the food items;
an external receptacle detachably connected to an outside of the housing and disposed outside of the housing during the operation of the grill such that the external receptacle is laterally removed from the grilling area;
an evacuation slide disposed below the source of radiant heat energy traversing downward and across and interior of the housing of the grill, and extending through the external opening and terminating outside the housing of the grill on a downward slope above the lowest point of the external receptacle and defining a path sloping downward along an entirety of the evacuation side to direct downward and laterally at least one of the liquefied fats and breakaway solids from the cooking of the food items that drop upon the evacuation slide to the external receptacle via the external opening; and
wherein the external receptacle is either attached or adjacent to the opening such that at least one of the liquefied fats and breakaway solids exiting through the external opening drop into the external receptacle for cooling therein and removal of at least one of the liquefied fats and breakaway solids;
wherein the external receptacle is disposed such that the receptacle's bottom section on which at least one of the liquefied fats and breakaway solids are collected is lower than a lower edge of the evacuation slide.

17. The electric grill of claim 16 wherein the evacuation slide defines a path to the external receptacle via the external opening and comprises a single angled slide.

18. The electric grill of claim 17, comprising a slot formed in a side of the housing which is opposite to the side of the housing which has the eternal opening, the slot being configured for receiving the single angled slide, such that the single angled slide is insertable into and removable from the grill's housing via the slot.

19. The electric grill of claim 17 wherein the single angled slide is removable from the housing and insertable into the housing through the external opening.

20. The electric grill of claim 16, comprising a short evacuation slide and a long evacuation slide disposed between sides of the housing, wherein the long evacuation slides is longer than the short evacuation slide and wherein the two evacuation slides are disposed in a y shaped assembly, such that at least a portion of the long evacuation slide is located below a lower end of the short evacuation slide, and such that at least one of the liquefied fats and breakaway solids splattered onto or collected on the short evacuation slide drops off a lower end of the short evacuation slide onto the long evacuation slide and wherein a lower end of the long evacuation slide in the y shaped assembly terminates in a downward sloping manner outside the body of the grill above the lowest point of the external receptacle.

21. The electric grill of claim 20, wherein the evacuation slides are insertable into the housing and removable from the housing through an opening in a top of the housing.

22. The electric grill of claim 16, wherein the evacuation slide comprises a pitched wedge tapering from a back of the wedge to a front of the wedge, and the external opening is sized to enable insertion of the wedge and removal of the wedge through the external opening in the housing, such that the front of the wedge terminates outside the housing of the grill on a downward slope above the lowest point of the external receptacle.

23. An electric grill for cooking food items, comprising:
a housing having a front vertical side and back vertical side, the front side having an external opening;
at least one vertical grilling area disposed adjacent to a source of radiant heat energy, the vertical grilling area comprising a food holder configured for holding the food items adjacent to the source of radiant heat energy and preventing the food items from falling while allowing at least of liquid waste and breakaway solids to separate and drop away from the food items;

an external receptacle detachably connected to the external opening in the front vertical side of the housing, and connected during the operation of the grill, the external receptacle being disposed outside the housing and laterally removed from the grilling area; and an evacuation slide, comprising a solid sloping plane below the source of radiant heat and cooking food items, the evacuation slide sloping downward along the evacuation slide's entirety, such that a higher end of the slide is positioned closer to the back side of the housing a lower end of the slide is positioned closer to the front side of the housing, the slide configured to intersect, interrupt and redirect a direction of at least one of the liquid waste and breakaway solids falling from the food items throughout cooking; and wherein as at least one the falling liquid waste and solids lands on the evacuation slide, the slope of the evacuation slide allows gravity to carry at least one of the falling liquid waste and breakaway solids downward and laterally across an interior of the housing of the grill through the external opening in the front vertical side of the grill to the outside of the grill and into the external receptacle; wherein the external receptacle is disposed such that the external receptacle's bottom section on which at least one of the liquid waste and solids is collected is lower than the lower end of the evacuation slide.

24. The electric grill of claim 1 wherein at least one of the one or more slides terminates outside the external opening.

25. The electric grill of claim 1 wherein at least one of the one or more slides terminates inside the external opening.

26. The electric grill of claim 1 wherein a lowest edge of the one or more slides is connected to the external receptacle.

27. The electric grill of claim 1, wherein a lowest of the one or more slides which terminates in the proximity of the external opening has a lower edge that is higher than a top edge of external receptacle.

28. The electric grill of claim 15, wherein the external receptacle comprises a hood configured for covering the open top of the receptacle, wherein the hood is openable and closable to respectively expose and cover the open top, and wherein the hood is tinted or transparent.

\* \* \* \* \*

UNITED STATES PATENT AND TRADEMARK OFFICE
CERTIFICATE OF CORRECTION

PATENT NO. : 8,997,635 B2
APPLICATION NO. : 13/083425
DATED : April 7, 2015
INVENTOR(S) : Yamaichi It is certified that error appears in the above-identified patent and that said Letters Patent is hereby corrected as shown below:

Title page

Item (76) Inventors: Delete, "Robert Bair" and insert --Robert James Bair--.

Signed and Sealed this
Twenty-ninth Day of September, 2015

Michelle K. Lee
*Director of the United States Patent and Trademark Office*